(12) United States Patent
Byeman et al.

(10) Patent No.: US 10,591,719 B2
(45) Date of Patent: Mar. 17, 2020

(54) LASER WELDED SCANNER ASSEMBLIES

(71) Applicant: Microvision, Inc., Redmond, WA (US)

(72) Inventors: Thomas Byeman, Redmond, WA (US); Naili Yue, Redmond, WA (US); Sumit Sharma, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 324 days.

(21) Appl. No.: 15/846,747

(22) Filed: Dec. 19, 2017

(65) Prior Publication Data

US 2019/0187458 A1 Jun. 20, 2019

(51) Int. Cl.
*G02B 26/08* (2006.01)
*G02B 26/10* (2006.01)
*H04N 9/31* (2006.01)

(52) U.S. Cl.
CPC ......... *G02B 26/105* (2013.01); *G02B 26/085* (2013.01); *G02B 26/0858* (2013.01); *H04N 9/3129* (2013.01)

(58) Field of Classification Search
CPC .............. G02B 26/105; G02B 26/0858; G02B 26/085; H04N 9/3129
See application file for complete search history.

(56) References Cited

U.S. PATENT DOCUMENTS

| | | | |
|---|---|---|---|
| 6,465,757 B1 | 10/2002 | Chen | |
| 8,305,672 B2 | 11/2012 | Luanava et al. | |
| 9,223,129 B2 | 12/2015 | Brown et al. | |
| 2003/0098295 A1 | 5/2003 | Kawamoto | |
| 2006/0175004 A1 | 8/2006 | Kurosaki | |
| 2006/0278617 A1 | 12/2006 | Anantharaman et al. | |
| 2009/0291244 A1 | 11/2009 | Kihara et al. | |
| 2017/0069555 A1* | 3/2017 | Milaninia | H01L 23/04 |
| 2017/0157838 A1 | 6/2017 | Thompson et al. | |

FOREIGN PATENT DOCUMENTS

| | | |
|---|---|---|
| JP | 2005-254481 | 9/2005 |
| KR | 10-1695416 | 1/2017 |
| KR | 10-2017-0019251 | 2/2017 |
| KR | 10-2017-0071815 | 6/2017 |

OTHER PUBLICATIONS

Microvision, Inc., "International Search Report and Written Opinion", dated Apr. 1, 2019.
Microvision, Inc., "International Search Report and Written Opinion", dated Mar. 28, 2019.
Yue, Naili et al., "A Novel Method to Enable Laser Welding of Liquid Crystal Polymer Metal Laser Mask Technique", www.microvision.com, May 10, 2017.

* cited by examiner

*Primary Examiner* — Euncha P Cherry
(74) *Attorney, Agent, or Firm* — Kevin D. Wills

(57) ABSTRACT

The embodiments described herein provide improved scanner assemblies that include a first plastic body, a second plastic body, a movable scanning platform and a drive device. The first plastic body includes a first plurality of coupling structures, while the second plastic body includes a second plurality of coupling structures. The moveable scanning platform is positioned between the first plastic body and the second plastic body, and each of the first plurality of coupling structures is welded to a corresponding one of the second plurality of coupling structures.

20 Claims, 11 Drawing Sheets

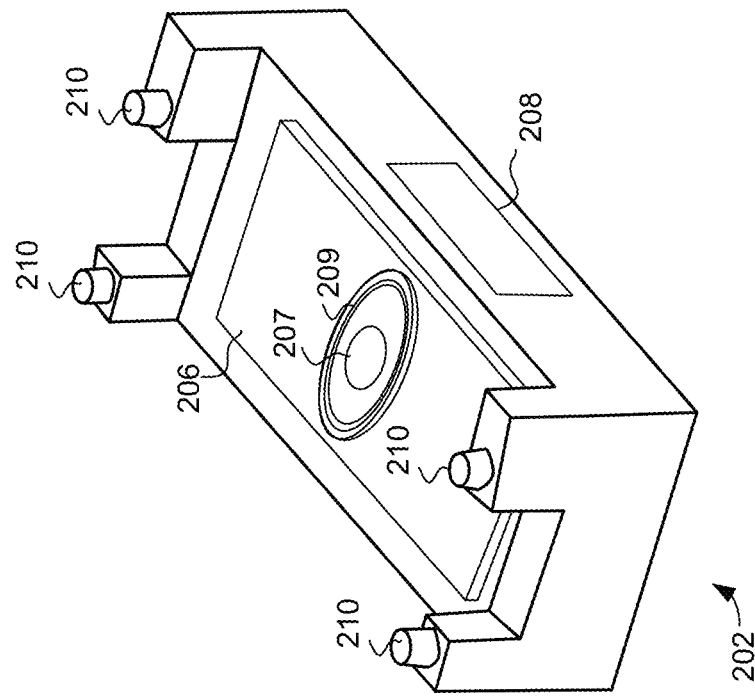
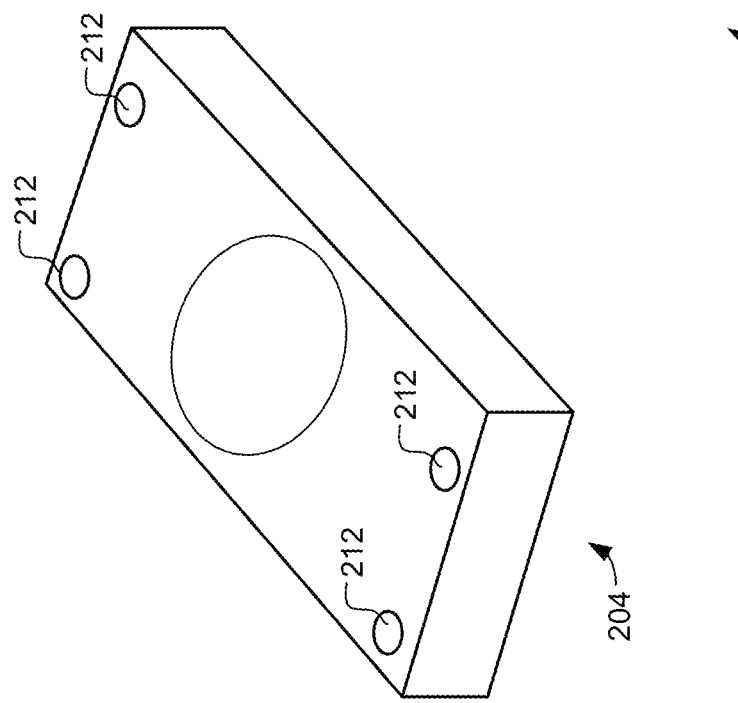
FIG. 2

LASER WELDED SCANNER ASSEMBLIES

RELATED APPLICATIONS

This application is related to the application entitled "Plastic Laser Welding with Partial Masking" filed on Dec. 19, 2017 with the application Ser. No. 15/846,701 and assigned to the same assignee.

FIELD

The present disclosure generally relates to scanning laser devices, and more particularly relates to scanning assemblies used in scanning laser devices.

BACKGROUND

In scanning laser devices, laser light is reflected off one or more scanning mirrors. Scanning laser projectors and laser depth scanners are two examples of scanning laser devices. In scanning laser projectors, images are projected by scanning laser light into a pattern with a scanning mirror, with individual pixels generated by modulating the laser light. Similarly, laser depth scanners generate depth maps by scanning laser light into a pattern with a scanning mirror and measuring depth based on the reflections of the laser light.

BRIEF SUMMARY OF THE INVENTION

Scanner assemblies are provided that include a first plastic body, a second plastic body, a movable scanning platform and a drive device. The first plastic body includes a first plurality of coupling structures, while the second plastic body includes a second plurality of coupling structures. The moveable scanning platform is positioned between the first plastic body and the second plastic body, and each of the first plurality of coupling structures is welded to a corresponding one of the second plurality of coupling structures. The first drive device is coupled to the first plastic body and is configured to drive motion of the movable scanning platform. In such devices, the embodiments described herein can facilitate improved yields, reduced costs, and increased performance in the manufacturing of scanner assemblies. Thus, the embodiments described herein can facilitate low cost and high-performance scanning laser devices.

The scanning mirrors are housed in scanner assemblies that also include elements used to induce motion in the mirrors. One benefit of scanning laser devices is their compact size in both scanning laser projectors and laser depth scanners. One limiting factor in the size and performance of current laser scanning devices is the size of the scanner assemblies that hold and power the scanning mirror. Other limiting factors include the manufacture these scanner assemblies with sufficient yield and at sufficiently low cost. These issues can be especially problematic for applications that require a relatively high performance and relatively low cost.

Thus, there is a need for improved scanner assemblies that can efficiently and cost effectively manufactured while providing relatively high performance.

BRIEF DESCRIPTION OF THE DRAWINGS

FIG. 2 is a perspective view of an exemplary scanner assembly in accordance with various embodiments of the present invention;

DESCRIPTION OF EMBODIMENTS

The embodiments described herein provide scanner assemblies for use in scanning laser devices, including scanning laser projectors, laser depth scanners, LIDAR systems, 3D motion sensing devices, gesture recognition devices, etc. Examples of such scanning laser projectors include traditional image projectors, head-up displays (HUD), and helmet mounted displays (HMD). The scanner assemblies are particularly applicable to scanning laser devices that use microelectromechanical system (MEMS) scanning platforms to facilitate mirror motion. In such devices, the embodiments described herein can facilitate improved yields, reduced costs, and increased performance in the manufacturing of scanner assemblies. Thus, the embodiments described herein can facilitate low cost and high performance scanning laser devices.

In accordance with the embodiments described herein scanner assemblies are provided that include a first plastic body, a second plastic body, a movable scanning platform and a drive device. The first plastic body includes a first plurality of coupling structures, while the second plastic body includes a second plurality of coupling structures. The moveable scanning platform is positioned between the first plastic body and the second plastic body, and each of the first plurality of coupling structures is welded to a corresponding one of the second plurality of coupling structures. The first drive device is coupled to the first plastic body and is configured to drive motion of the movable scanning platform.

As will be described in greater detail below, the use of coupling structures that are welded together can facilitate improved manufacturing yields, reduced costs, high reliability and increased performance. In some embodiments, the welding of coupling structures can facilitate the manufacturing of scanner assemblies that include relatively strong magnets in magnetic opposition, where the magnets could otherwise cause unwanted separation during or after manufacture of the scanner assembly.

Figure 1:
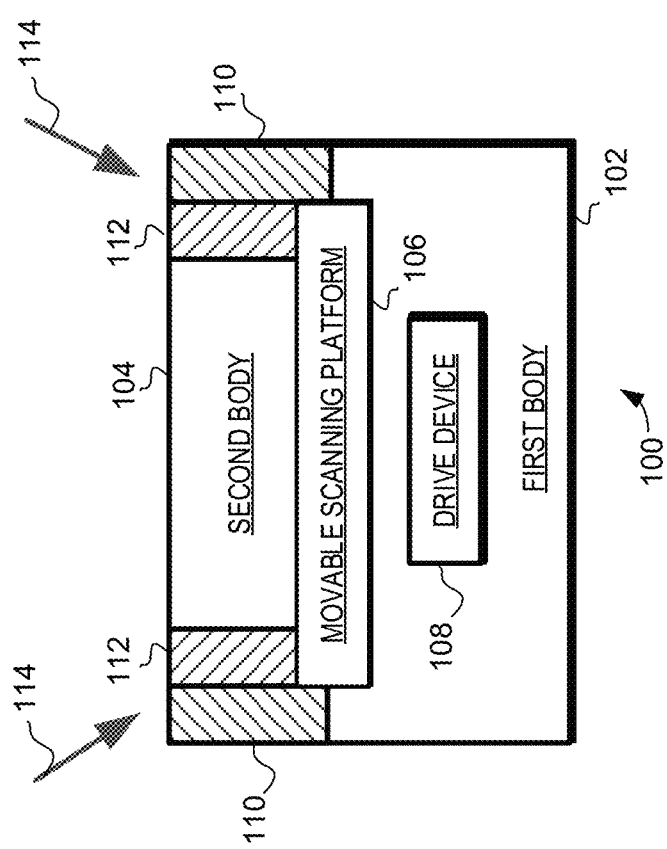
FIG. 1 shows a schematic diagram of an exemplary scanner assembly in accordance with various embodiments of the present invention.

Turning now to FIG. 1, a schematic view of a scanner assembly 100 is illustrated. The scanner assembly 100 includes a first plastic body 102, a second plastic body 104, a movable scanning platform 106 and a drive device 108. The first plastic body 102 includes a first plurality of coupling structures 110, while the second plastic body includes a second plurality of coupling structures 112. The moveable scanning platform 106 is positioned between the first plastic body 102 and the second plastic body 104. To permanently affix the first plastic body 102 to the second plastic body 104 each of the first plurality of coupling structures 110 is welded to a corresponding one of the second plurality of coupling structures 112. The drive device 108 is provided to drive motion of the movable scanning platform 106 and thus facilitate the use of the scanner assembly 100 in a scanning laser device.

As will be described in greater detail below, the welding of the each of the first plurality of coupling structures 110 to a corresponding one of the second plurality of coupling structures 112 can be performed by laser welding (e.g., with laser beams 114). In one specific embodiment, the laser welding can be done through a mask that facilitates improved welding strength and reduced device damage. Specifically, the coupling structures 110 and 112 can be welded by an infrared laser through a mask that includes at least one blocking feature and at least one passing feature for each of the second plurality of coupling structures. Such a procedure can be used to achieve a weld depth of greater than 0.20 mm, and more precisely between 0.20 mm and 0.27 mm in certain configurations. A detailed example of such an embodiment will be described in greater detail below with reference to FIGS. 4, 5 and 6.

In one embodiment the first plurality of coupling structures 110 and the second plurality of coupling structures 112 comprise a combination of posts and holes, where the holes are configured to receive the posts and be welded together. For example, the posts can comprise circular posts and the holes can comprise corresponding circular holes that are slightly larger than the posts. In one specific embodiment these circular posts can have a diameter between 0.55 mm and 0.65 mm, while the holes have a diameter between 0.57 mm and 0.65 mm. As will be described below, posts and holes of this size can be effectively welded together using a mask and a suitable infrared laser. However, it should again be noted that in other embodiments other types, shapes and sizes of coupling structures can be used. For example, rectangular structures, including rectangular posts and holes could be used.

The drive device 108 is coupled to the first plastic body 102 and is configured to drive motion of the movable scanning platform 106. In one embodiment the drive device 108 comprises one or more magnets configured to generate an electromagnetic field that interacts with the moveable scanning platform 106 to generate motion. In such an embodiment the movable scanning platform 106 can include a conductive coil that creates the electromagnetic interaction that generates the motion. In another embodiment the drive device 108 comprises a piezoelectric device that generates a mechanical movement in the scanning platform 106 in response to an electric signal.

The first plastic body 102 and the second plastic body 104 can be made from a variety of different plastics that are suitable for laser welding. For example, the first plastic body 102 and the second plastic body 104 can be molded from suitable liquid crystal polymers and/or amorphous polymers. As specific examples, Vectra® A115 and A130 can be used in some applications.

In some embodiments, the first plastic body 102 and the second plastic body 104 are manufactured by molding, where the molding defines the first plurality of coupling features 110 and the second plurality of coupling features 112. Furthermore, in some embodiments insert molding is used, where the insert molding allows one or more other devices (e.g., drive device 108) to be encased in the plastic that forms the first plastic body 102 and/or the second plastic body 104.

As described above, the moveable scanning platform 106 is movable to provide laser scanning. For example, the moveable scanning platform 106 can include a mirror configured to reflect laser light. The motion of the movable scanning platform 106 can be used to reflect the laser light into a pattern of scan lines, and this can facilitate laser image projection and/or laser depth sensing. Thus, the moveable scanning platform 106 can be used for a variety of scanning laser devices, including scanning laser projectors, laser depth scanners, LIDAR systems, 3D motion sensing devices, gesture recognition devices, etc.

In various embodiments the moveable scanning platform 106 can be configured to deflect along one or more than one axis. For example, in one embodiment that will be described in greater detail below the movable scanning platform 106 is configured to provide motion in two substantially perpendicular axes. In this embodiment a single scanner assembly 100 with a dual axis moveable scanning platform 106 can be used to generate a two dimensional laser scanning pattern.

In other embodiments the moveable scanning platform 106 can configured to deflect in only one axis. In such an embodiment multiple scanner assemblies 100 can be used together to provide deflection in multiple axes. For example, a first scanner assembly 100 can be used for relatively fast scan motion in one axis, while a second scanner assembly 100 is used for relatively slow scan motion in another axis. In one specific embodiment, the relatively fast scan motion comprises resonant sinusoidal motion while the relatively slow scan motion comprises non-resonant controlled motion. A detailed example of such an embodiment will be described below with reference to FIG. 8.

Turning now to FIG. 2, an exploded perspective view of a scanner assembly 200 is illustrated. The scanner assembly 200 includes a first plastic body 202, a second plastic body 204, a movable scanning platform 106 and a drive device 208. As was the described above, the first plastic body 202 and second plastic body 204 can comprise any suitable plastic material, including liquid crystal polymers and/or amorphous polymers. In accordance with the embodiments described herein, the first plastic body 202 includes a first plurality of coupling structures 210 and the second plastic body 204 includes a second plurality of coupling structures 212. Specifically, the first plurality of coupling structures 210 comprises four posts, and the second plurality of coupling structures 212 comprises four holes. The holes are arranged and configured to receive the corresponding posts when the first plastic body 202 is coupled to the second plastic body 204. The posts and holes can then be laser welded together to provide a permanent coupling of the first plastic body 202 to the second plastic body 204.

In the example of FIG. 2 the moveable scanning platform 206 comprises a mirror 207 configured to reflect laser light to provide laser scanning specifically, the motion of the mirror 207 reflects the laser light into a pattern of scan lines, and this can facilitate laser image projection and/or laser depth sensing. In various embodiments the moveable scanning platform 206 and mirror 207 can be configured to deflect the laser light in one axis, while in other embodiments the moveable scanning platform 206 and mirror 207 are configured to provide motion in two substantially perpendicular axes.

The drive device 208 is coupled to the first plastic body 202 and is configured to drive motion of the movable scanning platform 206. In one embodiment the drive device 208 comprises one or more magnets configured to generate an electromagnetic field that interacts with a coil 209 on the moveable scanning platform 206. When an appropriate signal is provided to the coil 209 this interaction between the coil and the electromagnetic field generates the desired motion of the mirror 207.

In some embodiments the second plastic body 204 can include a second drive device. This second drive device can be used to drive motion in a second axis. Such a second drive device can also comprise one or more magnets configured to generate a second electromagnetic field that interacts with the coil 209 or other such coils. Such embodiments can be used to facilitate mirror motion in two substantially perpendicular axes.

In another embodiment the drive device 208 comprises one or more piezoelectric devices that generate a mechanical movement in the mirror 207 in response to an electric dive signal. In such an application the piezoelectric device would typically be mechanically coupled to the mirror 207 to facilitate motion of the mirror 207.

A variety of other features not illustrated in FIG. 2 could also be included in the scanner assembly 200. For example, a variety of electrical contracts can be formed to provide electrical connection between the movable scanning platform 206 and the overall scanning device. As another example, in some embodiments the scanner assembly 200 may also incorporate one or sensors. For example, the scanner assembly 200 may also include one or more integrated piezoresistive position sensors. These piezoresistive sensors can be configured to produces a voltage that represents the displacement of mirror 207, and this voltage can be provided as feedback to the drive circuit.

As described above, the first plastic body 202 and the second plastic body 204 can each include one or more magnets. These magnets can be configured in magnetic opposition and thus can apply significant separation forces to the bodies 202 and 204. The presence of these magnets and the resulting separation forces provides the need for relatively strong bonds between the first body 202 and the second plastic body 204. Furthermore, the separation forces caused presence of these magnets can complicate the manufacturing of the scanner assembly 200.

To overcome these difficulties the first plastic body 202 is welded to the second plastic body 204. Specifically, each of the first plurality of coupling structures 210 is laser welded to a corresponding one of the second plurality of coupling structures 212. In one specific embodiment that will be described in greater detail below, the laser welding can be done through a mask that includes at least one blocking feature and at least one passing feature for each of the post/hole combinations.

Such a welding procedure can provide a relatively strong bond. Furthermore, such a welding procedure can provide this high strength bond relatively quickly. Thus, such a welding procedure can reduce or even eliminate the need for special clamping and other time consuming procedures that could be required to overcome the separation forces to hold the bodies 202 and 204 together when using other bonding techniques. Presently, adhesive bonding is a major method to join two pieces of plastics. One issue with adhesive bonding is the need for clamping pieces together while the adhesive drives. The laser welding procedure can eliminate the need for clamping that would otherwise be required to hold the bodies 202 and 204 together while an adhesive dries. This reduction in the need for clamping and in the time needed to form the bond can greatly simplifying the manufacturing process, and thus can increase yield and reduce costs.

Furthermore, the use of adhesives can provide limited bonding strength due to the weak skin effects in plastics that can potentially lead to separation of the two mating plastics. The use of the laser welding procedure can avoid these weak skin effects and thus provide a stronger bond between bodies. This stronger bond adds strength over life and thus can improve the long term reliability and longevity of the scanner assembly. Furthermore, this technique can result in a weld between the plastic bodies with increased bond strength, while also reducing the potential for damage on the welded surface. For example, this technique can allow for increased welding depth and/or reduced evaporation and oxidation of material at the surface of the plastic bodies. Increasing the welding depth can result in increased bonding strength, and thus this technique can be used to weld bodies together that are subject to significant separation forces during use.

Furthermore, this technique does not require the use of plastic that is transmissive to the welding laser. Thus, in some embodiments both of the plastic bodies can be made of plastics that are opaque to and thus absorb the welding laser. The ability to use opaque plastics can facilitate the use of stronger plastics in the scanner assembly. Specifically, plastics can be made stronger by reinforcing the plastic with a certain percentage of particulate like carbon or fiber like silica (SiO2). However the addition of these extra reinforcements reduces plastic's transmission to light, limiting the ability to use these reinforced plastics in transmission laser welding. Thus, the embodiments described herein can facilitate the use of higher strength reinforced plastics by facilitating the use of absorption laser welding.

As one example implementation, a post-hole coupling feature made from liquid crystal polymer having a shear strength of 5.935 kgf/mm$^2$ and having a post radius of 0.3 mm can be welded through a mask using an infrared laser of 808 mm such a configuration can result in a welding depth of 0.27 mm without causing excessive damage to the surface. At this welding depth the welded bond can withstand a shear force of 3.02 kgf. In contrast, without the mask the welding depth would be limited to 0.12 mm, and thus would only provide the ability to withstand a shear force of 1.22 kgf. Thus, in this embodiment the use of the laser mask is able to more than double the strength of the bond created by laser welding.

Figure 3A:
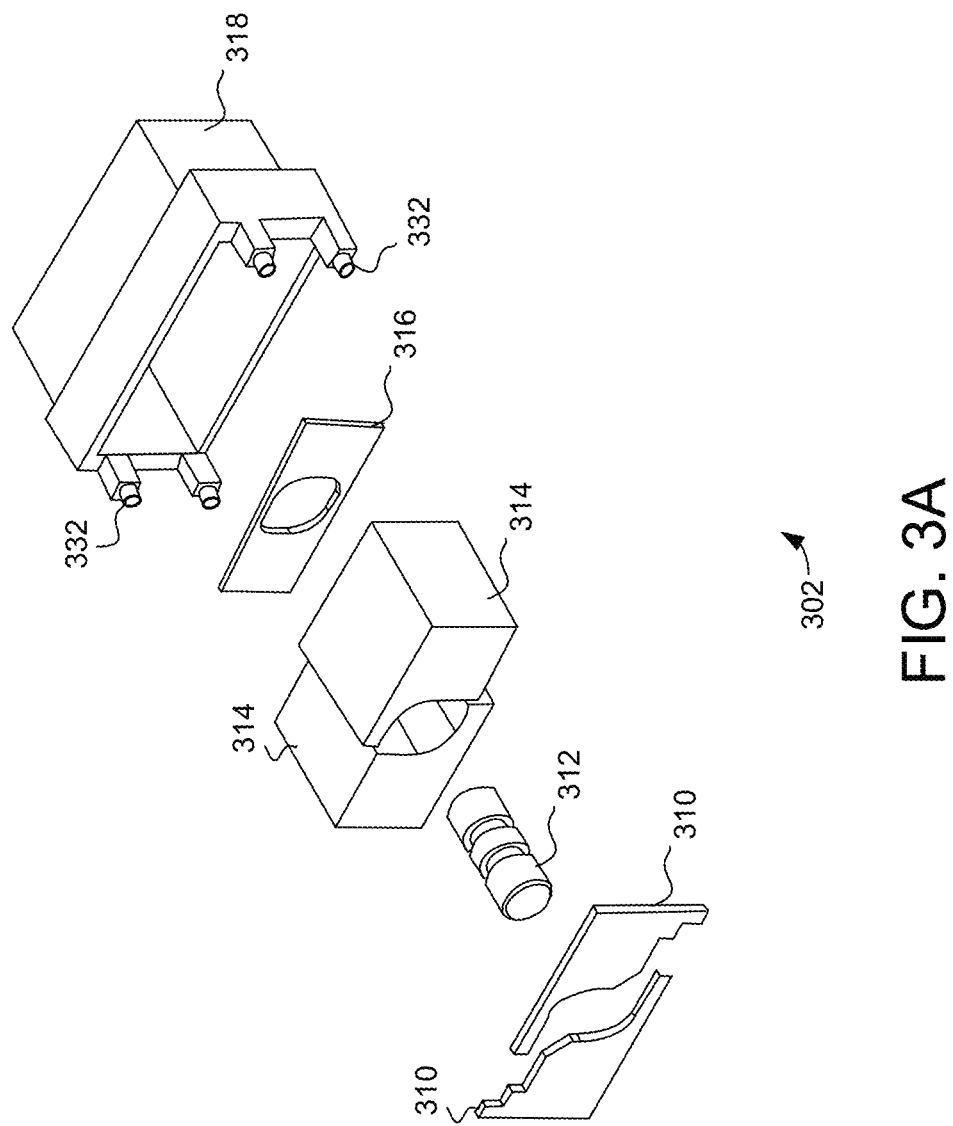
FIGS. 3A, 3B and 3C are exploded perspective views of an exemplary scanner assembly in accordance with various embodiments of the present invention.
Figure 3B:
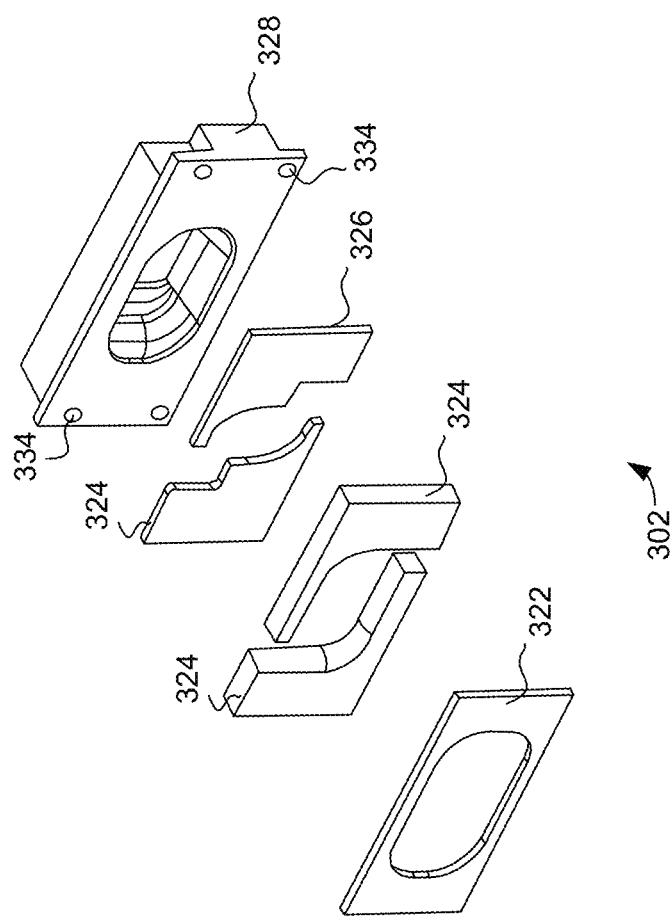
Figure 3C:
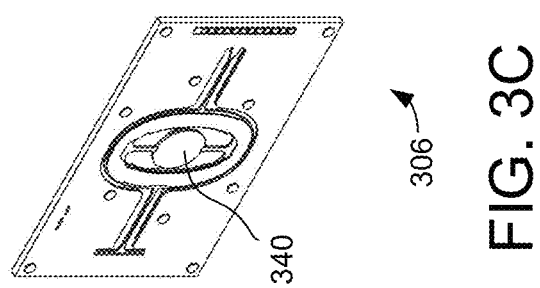

Turning now to FIGS. 3A, 3B, and 3C, exploded views of an exemplary scanner assembly 300 is illustrated. Specifically, FIG. 3A illustrates an exploded view of a first body 302, FIG. 3B illustrates an exploded view of a second body 304, and FIG. 3C illustrates an exemplary scanning platform 306. In this embodiment magnets are provided in both first body 302 and the second body 304 as drive devices to generate motion in the scanning platform 306 in two substantially perpendicular axes.

In FIG. 3A the first body 302 is formed to include field focus plates 310, pin 312, magnets 314, and a field closer plate 316. In general, the magnets 314 generate an electromagnetic field, the field focus plates 310 focus the magnetic field on the scanning platform 306, and the field closer plate 316 ties the magnets 314 together. Together, these elements generate an electromagnetic field that is used to drive motion of the scanning platform 306 in a first axis direction.

In one embodiment, the plastic body 302 is formed with insert molding. Thus, the field focus plates 310, pin 312, magnets 314, and field closer plate 316 are placed inside a mold that is then filled with hot liquid plastic. The plastic solidifies as it cools to form the first plastic structure 318, with the field focus plates 310, pin 312, magnets 314, and field closer plate 316 encased within the plastic structure 318.

Likewise, in FIG. 3B the second body 304 is formed to include field focus plates 326 magnets 324, and a field closer plate 322. Again, the magnets 324 generate an electromagnetic field, the field focus plates 324 focus the magnetic field on the scanning platform 306, and the field closer plate 322 ties the magnets 324 together. Together, these elements generate an electromagnetic field that is used to drive motion of the scanning platform 306 in a second axis direction, perpendicular to the first axis.

Again, in one embodiment, the plastic body 304 is formed with insert molding. Thus, the field focus plates 326, magnets 324, and field closer plate 322 are placed inside a mold that is then filled with hot liquid plastic. The plastic solidifies as it cools to form the first plastic structure 328, with the field focus plates 326, magnets 324, and field closer plate 322 encased within the plastic structure 328.

In FIG. 3C the scanning platform 306 comprises a mirror 340 configured to reflect laser light to provide laser scanning. Specifically, the motion of the mirror 340 reflects the laser light into a pattern of scan lines, and this can facilitate laser image projection and/or laser depth sensing. In this illustrated embodiment mirror 340 is coupled with flexures that facilitate motion in two substantially perpendicular directions. The scanning platform 306 also includes coils and various traces (not shown in FIG. 3C) to provide electric signals to those coils. When appropriate signals are provided to the coils the electromagnetic interactions between the coils and the magnets 314 and 324 generate the desired motion of the mirror 340. The scanning platform 306 could also include one or sensors to measure the position and/or movement of the mirror 340.

In one embodiment the scanning platform 306 is formed from a semiconductor substrate using MEMS techniques, including photolithography and micromachining. In one example embodiment, the scanning platform 306 could be photolithographically formed from single-crystal silicon. However, use of polycrystalline silicon or combination of single and polycrystalline silicon can also be used to achieve the desired structures.

In accordance with the embodiments described herein, the first body 302 includes a first plurality of coupling structures 332 and the second body 304 includes a second plurality of coupling structures 334. Specifically, the first plurality of coupling structures 332 comprises four posts, and the second plurality of coupling structures 334 comprises four holes. The holes are arranged and configured to receive the corresponding posts when the first body 302 is coupled to the second body 304. The posts and holes can then be laser welded together to provide a permanent coupling of the first body 302 to the second body 304.

In one embodiment the posts and holes can be laser welded using a mask with blocking features and passing features to improve the strength of the bonding between the first body 302 and the second body 304. In such an embodiment, the scanning platform 306 would be placed between the first body 302 and the second body 304. The posts in the first body 302 are placed in the corresponding holes. The mask is positioned over the second body, with the blocking features and passing features proximate to the posts and holes. The posts and holes can then be laser welded through the blocking and passing features together to provide a permanent coupling of the first body 302 to the second body 304.

Figure 4C:
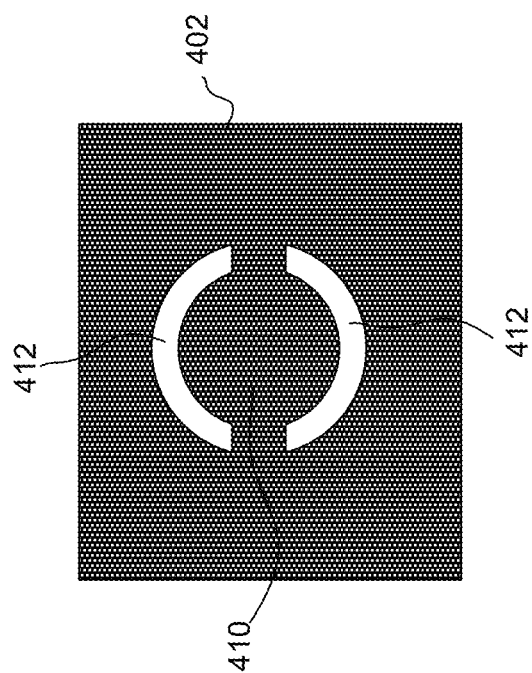
FIGS. 4A, 4B, and 4C are top views of a first body with a second body, a mask, and an enlarged view of the mask in accordance with an embodiment of the present invention.
Figure 4A:
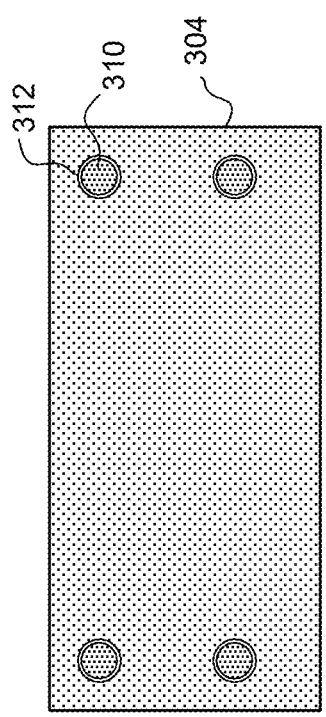

Turning now to FIG. 4A, a top view of the first body 302 and the second body 304 is illustrated. In this figure the two bodies 302 and 304 are coupled together such that each of the four posts is in a corresponding hole. As such, the first body 302 and the second body 304 are in position to be welded.

Figure 4B:
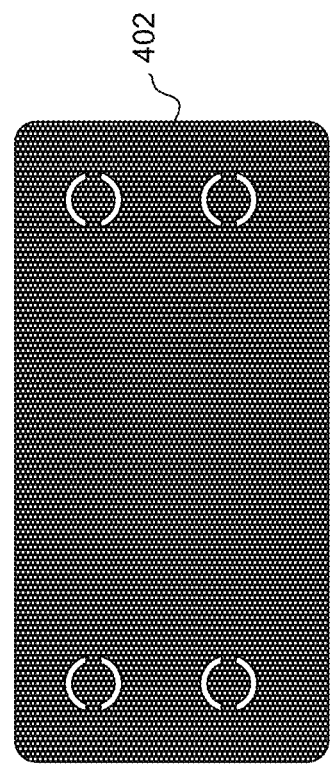

FIG. 4B illustrates a top view of an exemplary mask 402. The mask includes a plurality of blocking features 410 and a plurality of passing features 412. The configuration and arrangement of the blocking features 410 and the passing features 412 correspond to the arrangement of the posts and the holes in the bodies 302 and 304. Thus, the mask 402 can be positioned such that the each of blocking features 410 and passing features 412 are each proximate to a corresponding post and hole. This allows for the posts and holes to be welded together by applying a laser beam to the blocking features 410 and the passing features 412.

Specifically, for each post/hole combination, a laser beam is applied such that a first portion of the laser beam impacts and is absorbed by the blocking feature 410 while a second portion of the laser beam passes through the passing feature 412. The first portion of the laser beam heats the blocking feature 410, and the heat spreads by conduction to the underlying post. At the same time, the second portion of the laser beam passes through the passing features 412 and impacts the exposed region of the second body 304 surrounding the hole. This combination of simultaneously heating the post by conduction and heating the exposed regions around the hole by direct impact of the laser melts the plastic and welds the post and hole together.

Turning now to FIG. 4C, an expanded view of one blocking feature 410 and two passing features 412 is illustrated. As can be more clearly seen in this expanded view, the blocking feature 410 has a partially circular shape. Likewise, the passing features 412 each have a partially annular shape that surrounds the partially circular shape. These shapes correspond to the shapes of the underlying post/hole combination. Thus, the circular shape can at least substantially cover the underlying post, while the annular shape exposes a region around the hole. Thus, in a typical embodiment the circular shape would have a diameter that corresponds to the diameter of the underlying post.

The mask 402 used in these techniques can be made from a variety of materials. For example, the mask 402 can be formed from a variety of metals. These metals can provide relatively high rate of heat conduction to the underlying plastic. Examples of such metals include titanium, tungsten, and copper. In each case the mask 402 can comprise any suitable alloy or other combination of metals. As one specific example, titanium Ti-6A1-4V can be used. In other examples the mask 402 can be fabricated from a suitable glass or crystalline material with a suitably high melting point.

The laser light blocking features 410 and laser light passing features 412 can likewise be implemented in a variety structures. For example, in one embodiment the laser light passing features 412 are implemented as an opening that is adjacent to the corresponding blocking feature 410. In other embodiments the laser light passing features 412 are fabricated from a material that is at least partially transmissive to the laser beam used for welding. For example, the laser light passing features 412 can be implemented with a high melting point glass material.

The laser light blocking feature 410 and laser light passing feature 412 can likewise be implemented in a variety shapes. In a typical embodiment the shape of these features would be optimized for the structure and shape of the coupling structures being welded.

These welding techniques can use a variety of different types of lasers. For example, lasers that generate laser beams having wavelengths between 300 nm and 1200 nm can be used in some applications. In more specific examples, infrared lasers can be used. For example, infrared lasers having wavelengths between 700 nm and 900 nm can be used. As one specific example, a semiconductor infrared laser having a wavelength of 808 nm and 30 W of power can be used.

Figure 5A:
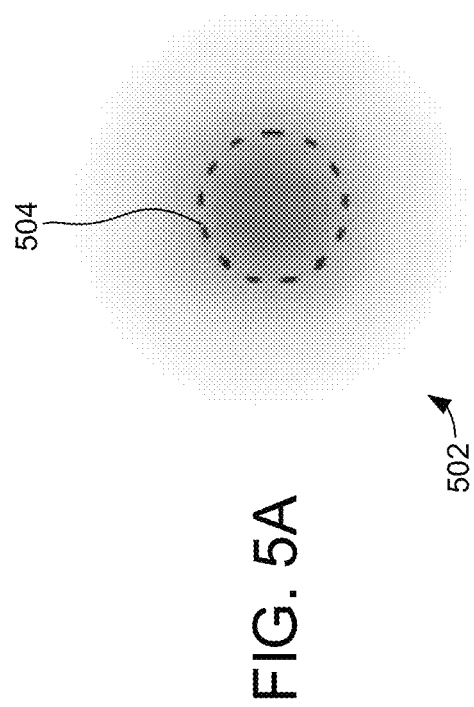
FIGS. 5A and 5B are diagrams illustrating laser intensity in accordance with various embodiments of the present invention.
Figure 5B:
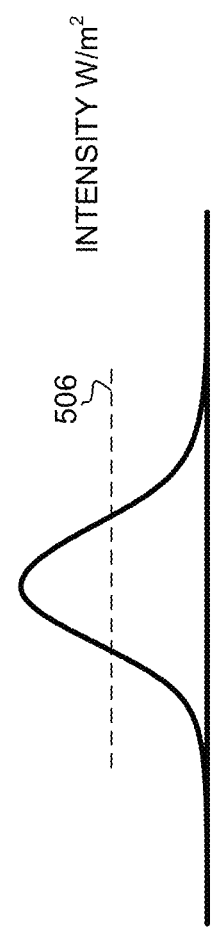

In some embodiments it may also be desirable to correlate the intensity of the welding laser beam to the size of the blocking feature 410 and/or coupling feature 412. Turning now to FIG. 5A, a cross sectional view of intensity in an exemplary laser beam 502 is illustrated. In FIG. 5A the intensity of the laser beam 502 is illustrated in grey scale, with darker areas having more intensity than lighter areas. A corresponding profile of the laser energy density is illustrated in FIG. 5B, with the intensity illustrated in the units of watts per meter squared (W/m²). As can be seen in these FIGS, the intensity of the laser follows a Gaussian distribution that is greatest near the center of the beam and drops off exponentially as distance from the center of the beam increases.

In some embodiments it can be desirable to correlate the size of the blocking feature and/or passing feature with the intensity profile of the welding laser beam. Likewise, the size of the coupling features (e.g., post and hole) can also be correlated to the size intensity profile of the laser beam.

As one specific example, the circular shape of the blocking feature can have a diameter between 0.55 mm and 0.65 mm. Likewise, the annular shape of the passing features can have collective outer diameter between 0.85 mm and 0.95 mm. In such an example the laser beam used for welding may have a beam diameter of between 0.5 mm and 0.7 mm.

In the example of FIGS. 5A and 5B, the circle 504 and line 506 indicate the where the intensity of the laser drops below ~60-80% of the maximum intensity. As one example embodiment, the laser beam can be configured (and/the blocking feature sized) such that the portion of the laser beam in the center and above the intensity levels indicated by circle 504 and line 606 strike the blocking feature, while a portion of the laser beam below that intensity level can pass through the passing feature and impact the underlying plastic body. Thus, in such a configuration the plastic body is protected in part from the highest intensity regions of the laser beam, and thus damage to the surface that would otherwise be caused by that high intensity can be reduced.

Furthermore, in some lasers the intensity profile is less homogenous in the center of the laser and in such an embodiment the blocking feature can additionally serve to homogenize the energy that is applied to the plastic body in the corresponding region.

It should be noted that the example illustrated in FIGS. 5A and 5B is just one example, and that other laser intensity profiles and relative sizes of features can be used.

Figure 6C:
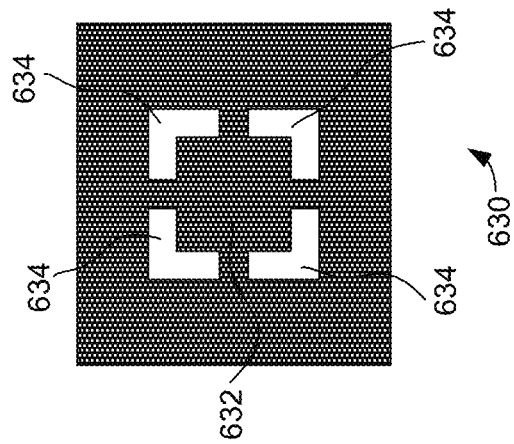
FIGS. 6A, 6B, 6C, and 6D are partial views of exemplary masks in accordance with various embodiments of the present invention

It should again be noted that the example of FIG. 4C is just one example of how the blocking features and passing features can be implemented. Turning now to FIG. 6A, another expanded view of an exemplary mask portion 602 is illustrated. The mask portion 602 includes a blocking feature 610 and three passing features 612. Like the example of FIG. 4C, the blocking feature 610 has a partially circular shape, and the passing features 612 each have a partially annular shape that surrounds the partially circular shape. However, in this case there are three passing features 612 and thus three connections between the mask portion 602 and the blocking feature 610. Again, in some embodiments these shapes would be configured to correspond to the shapes of the underlying features that are to be welded.

Figure 6B:
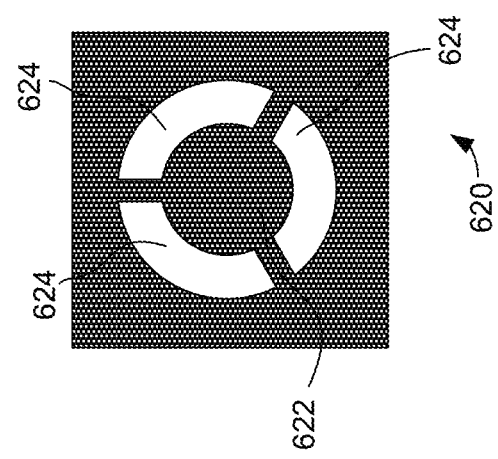
Figure 6A:
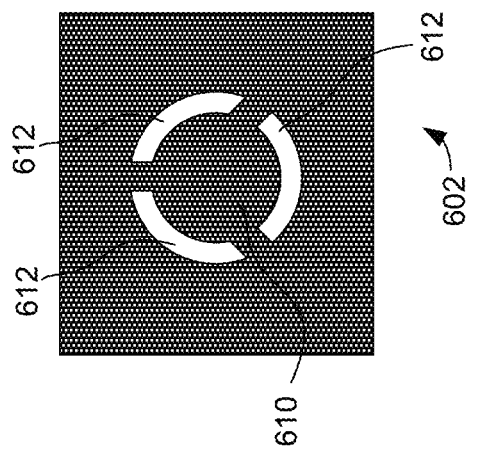

Turning now to FIG. 6B, another expanded view of an exemplary mask portion 620 is illustrated. The mask portion 620 includes a blocking feature 622 and three passing features 624. Like the example of FIG. 6A, the blocking feature 622 has a partially circular shape, and the passing features 624 each have a partially annular shape that surround the partially circular shape. However, in this case passing features 624 are relatively large, and thus more laser light would be allowed to directly impact the underlying body.

Turning now to FIG. 6C, another expanded view of an exemplary mask portion 630 is illustrated. The mask portion 630 includes a blocking feature 632 and four passing features 634. In this example the blocking feature 632 has a partially square shape, and the passing features 634 each have a corner shape that in part surround the partially square shape.

Figure 6D:
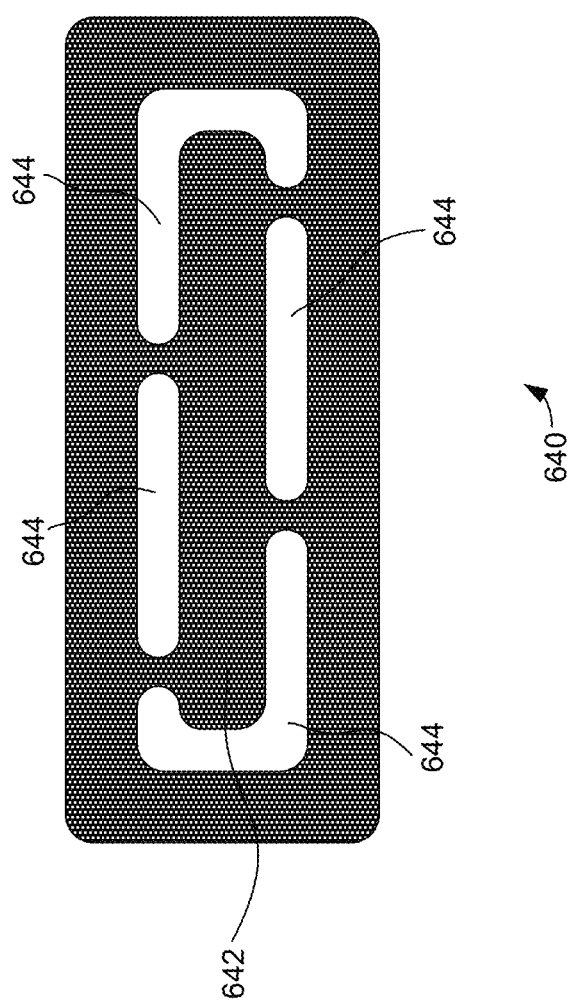

Turning now to FIG. 6D, another expanded view of an exemplary mask portion 640 is illustrated. The mask portion 640 includes a blocking feature 642 and four passing features 644. In this example the blocking feature 642 has a partially rectangular shape, and the passing features 644 have various different shapes that together partially surround the blocking feature 642.

Again, the mask portions illustrated in FIGS. 6A, 6B, 6C, and 6D are just some of the shapes and structures that can be implemented and used. For example, various configurations of curved, bent, and irregular shapes can be used. In each of these embodiments the shape can be configured to follow the weld line of the laser.

Figure 7:
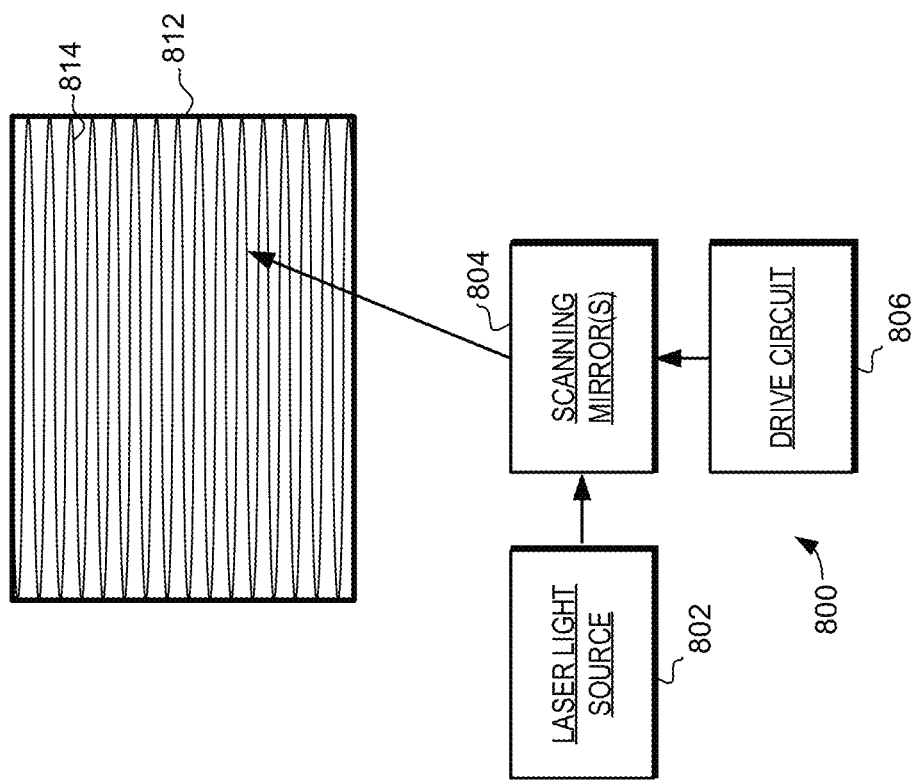
FIG. 7 shows a schematic view of a scanning laser device in accordance with various embodiments of the present invention.

Turning now to FIG. 7, a schematic diagram of a scanning laser device 800 is illustrated. The scanning laser device 800 includes a laser light source 802, scanning mirror(s) 804 and a drive circuit 806. During operation, the laser light source 802 generates at least one beam of laser light that is reflected by the scanning mirror(s) 804 into a pattern 814 of scan lines inside a scanning region 812. In the example of FIG. 7, the pattern 814 of scan lines comprises a raster pattern. However, this is just one example, and in other embodiments other patterns of scan lines can be generated as used. For example, spiral patterns and Lissajous patterns could instead be implemented.

To facilitate this, the drive circuit 806 controls the movement of the scanning mirror(s) 804. Specifically, the drive circuit 806 provides excitation signal(s) to excite motion of the scanning mirror(s) 804.

In accordance with the embodiments described herein, one or more of the scanning mirrors 804 is implemented with a scanner assemblies as described above (e.g., scanner assemblies 100, 200, 300 etc.). Such a scanning laser device 800 can be implemented to perform a variety of functions. For example, the scanning laser device 800 can be implemented to facilitate image projection, laser depth scanning, LIDAR, 3D motion sensing, gesture recognition, etc.

As one example, in a device implemented to provide image projection, the beam of laser light would be encoded with pixel data to generate image pixels. In another example, the laser light source 802 can include an infrared or other suitable laser that is used to generate the depth mapping pulses. Reflections of these pulses from a surface can then be received and used to generate 3-dimensional maps of the surface. For example, the depth map of the surface can be determined by calculating a time of flight for the return of each received depth mapping pulse.

Figure 8:
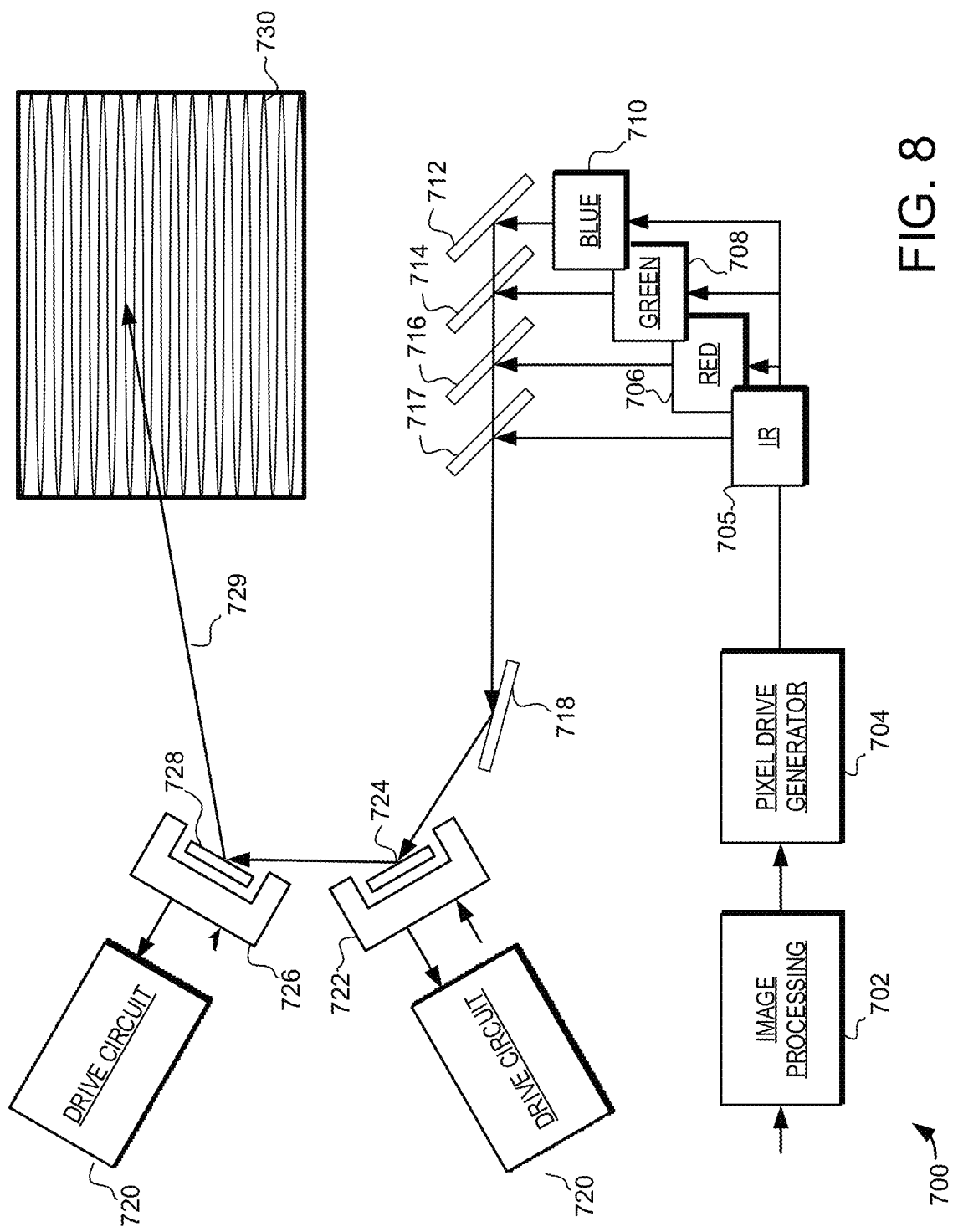
FIG. 8 shows a schematic view of a scanning laser projector in accordance with various embodiments of the present invention.

Turning now to FIG. 8, a schematic view of a scanning laser projector 700 is illustrated. The scanning laser projector 700 is a more detailed example of the type of system that can be used in accordance with various embodiments of the present invention. Specifically, the scanning laser projector 700 can be implemented using the various scanner assemblies described above. In some embodiments, the scanning laser projector is implemented to provide both laser depth scanning and laser image projection, while in other embodiments only image projection is provided.

Scanning laser projector 700 includes an image processing component 702, a pixel drive generator 704, an infrared laser module 705, a red laser module 706, a green laser module 708, and a blue laser module 710. In such an embodiment the red, green and blue light can be used for image projection, while the infrared light can be used for depth scanning. Light from the laser modules is combined with dichroics 712, 714, 716, and 717. Scanning laser projector 700 also includes fold mirror 718, drive circuits 720, a first scanner assembly 722 with first scanning mirror 724, and second scanner assembly 726 with a second scanning mirror 728. It should be noted that this illustrated arrangement for combing the outputs from the various laser modules is just one example implementation, and other implementations using different techniques for combing laser light of different wavelengths can instead be used.

In operation, image processing component 702 processes video content using two dimensional interpolation algorithms to determine the appropriate spatial image content for each scan position at which an output pixel is to be displayed by the pixel drive generator 704. For example, the video content may represent a grid of pixels at any resolution (e.g., 640×480, 848×480, 1280×720, and 1920×1080). The input light intensity encoding typically represents the light intensity in 8, 10, 12 bit or higher resolutions.

This content is then mapped to a commanded current for each of the red, green, and blue laser sources such that the output intensity from the lasers is consistent with the input image content. In some embodiments, this process occurs at output pixel rates in excess of 150 MHz. The laser beams are then directed onto scanning mirrors 724 and 728. In general, the first scanning mirror 724 provides for one axis of motion (e.g., horizontal), while the second scanning mirror 728 provides for another axis of motion (e.g., vertical). In a typical implementation of such an embodiment, the second scanning mirror 728 is operated to provide the vertical scanning motion at a relatively slow scan rate, while the first scanning mirror 724 is operated to provide horizontal motion at a relatively fast scan rate. This results in the output beam 729 generating a scanning pattern 730.

To provide such a system, the rotation of the second scanning mirror 728 can be operated quasi-statically to create a vertical sawtooth raster trajectory. Conversely, the rotation of the first mirror 724 can be operated on a resonant vibrational mode of the scanning mirror 724 to create sinusoidal motion. Together, this generates both horizontal and vertical motion of the laser beam and results in the pattern 514 of scan lines.

In these embodiments, output beam 729 sweeps back and forth left-to-right in a sinusoidal pattern, and sweeps vertically (top-to-bottom) in a sawtooth pattern with the display blanked during flyback (bottom-to-top). It should be noted that the illustrated scanning pattern 730 shows a sinusoidal pattern as the beam sweeps vertically top-to-bottom, but does not show the flyback from bottom-to-top.

In other embodiments, the vertical sweep is controlled with a triangular wave such that there is no flyback. In still further embodiments, the vertical sweep is sinusoidal. Finally, the various embodiments of the invention are not limited by the waveforms used to control the vertical and horizontal sweep or the resulting raster pattern 730.

It should be noted that in some embodiments, the first scanner assembly 722 and the second scanner assembly 726 both use electromagnetic actuation. However, in other embodiments one more of the scanner assemblies can use other techniques, including electrostatic or piezoelectric actuation. Furthermore, any number of mirrors and type of mirror actuation may be employed without departing from the scope of the present invention.

The drive circuits 720 provide drive signals to scanner assemblies 722 and 726. The drive signals include excitation signals to control the motion of the scanning mirrors 724 and 728. In operation, the laser light sources produce light pulses for each output pixel and scanning mirrors 724 and 728 reflect the light pulses as the output beam 729 traverses the pattern 730. Drive circuits 720 can also receive feedback signals from MEMS mirror assemblies 722 and 726. The feedback signals can describe the driven deflection angles of the mirrors, and can be used by the drive circuit 720 to more accurately control the motion of the scanning mirror 724.

For example, the drive circuit 720 can excite resonant motion of scanning mirror 724 such that the peak amplitude of the feedback signal is constant. This provides for a stable maximum angular deflection on the fast-scan axis as shown in raster pattern 730. The excitation signal used to excite resonant motion of scanning mirror 724 can include both amplitude and a phase. Drive circuit 720 includes feedback circuit(s) that modifies the excitation signal amplitude to keep the feedback signal peak amplitude substantially constant. Additionally, the drive circuit 720 can modify the excitation signal to control the horizontal phase alignment and vertical position of the raster pattern 730.

To facilitate this, drive circuit 720 may be implemented in hardware, a programmable processor, or in any combination. For example, in some embodiments, drive circuit 720 is implemented in an application specific integrated circuit (ASIC). Further, in some embodiments, some of the faster data path control is performed in an ASIC and overall control is provided by a software programmable microprocessor.

It should be noted that while FIG. 8 illustrates an embodiment with two drive circuits 720 and two scanner assemblies 722 and 726, that this is just one example implementation. As another example, a scanning laser projector could instead be implemented with fewer or more scanning mirror assemblies and mirrors. Finally, although red, green, blue, and infrared laser light sources are shown in FIG. 8, the various embodiments are not limited to these exemplary wavelengths of laser light.

In one embodiment, a scanner assembly is provided, comprising: a first plastic body, the first plastic body including a first plurality of coupling structures; a second plastic body, the second plastic body including a second plurality of coupling structures, each of the second plurality of coupling structures welded to corresponding one of the first plurality of coupling structures; a moveable scanning platform positioned between the first plastic body and the second plastic body; and a first drive device coupled to the first plastic body, the drive device configured to drive motion of the moveable scanning platform.

In another embodiment, a scanner assembly is provided, comprising: a first plastic body, the first plastic body insert molded to include at least a first magnet and a first field focusing plate encased within the first plastic body, the first plastic body further including a first plurality of coupling structures; a second plastic body, the second plastic including a second plurality of coupling structures, each of the second plurality of coupling structures laser welded to a corresponding one of the first plurality of coupling structures; and a scanning mirror positioned between the first plastic body and the second plastic body, the scanning mirror including a conductive coil configured to drive motion of the scanning mirror in the presence of a magnetic field generated by at least the first magnet.

In another embodiment, a MEMS scanner assembly is provided, comprising: a first plastic body, the first plastic body insert molded to include at least a first magnet and a first field focusing plate encased within the first plastic body, the first plastic body further including a first plurality of coupling structures; a second plastic body, the second plastic body insert molded to include at least a second magnet and second field focusing plate encased within the second plastic body, the second plastic further including a second plurality of coupling structures, each of the second plurality of coupling structures laser welded to a corresponding one of the first plurality of coupling structures; and a MEMS scanning mirror positioned between the first plastic body and the second plastic body, the MEMS scanning mirror including a conductive coil configured to drive motion of the MEMS scanning mirror in the presence of a magnetic field generated by at least the first magnet and the second magnet.

In the preceding detailed description, reference was made to the accompanying drawings that show, by way of illustration, specific embodiments in which the invention may be practiced. These embodiments were described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The preceding detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanner assembly, comprising:
    a first plastic body, the first plastic body including a first plurality of coupling structures;
    a second plastic body, the second plastic body including a second plurality of coupling structures, each of the second plurality of coupling structures welded to corresponding one of the first plurality of coupling structures;
    a moveable scanning platform positioned between the first plastic body and the second plastic body; and
    a first drive device coupled to the first plastic body, the drive device configured to drive motion of the moveable scanning platform.

2. The scanner assembly of claim 1, wherein the first plurality of coupling structures comprises posts and wherein the second plurality of coupling structures comprises holes.

3. The scanner assembly of claim 1, wherein the first plurality of coupling structures are arranged at corners of the first plastic body and wherein the second plurality of coupling structures are arranged at corresponding corners of the second plastic body.

4. The scanner assembly of claim 1, wherein each of the second plurality of coupling structures is welded to corresponding one of the first plurality of coupling structures to a weld depth greater than 0.20 mm.

5. The scanner assembly of claim 1, wherein each of the second plurality of coupling structures is welded to corresponding one of the first plurality of coupling structures by an infrared laser through a mask including at least one blocking feature and at least one passing feature for each of the second plurality of coupling structures to achieve a weld depth of between 0.20 mm and 0.27 mm.

6. The scanner assembly of claim 1, wherein the first drive device comprises a first magnet, the first magnet encased in the first plastic body.

7. The scanner assembly of claim 6, further comprising a second magnet encased in the second plastic body.

8. The scanner assembly of claim 7, wherein the moveable scanning platform further comprises a conductive coil configured to drive motion of the moveable scanning platform in the presence of a magnetic field generated by at least the first magnet and the second magnet.

9. The scanner assembly of claim 1, wherein the first drive device comprises a piezoelectric drive device, the piezoelectric drive device encased in the first plastic body.

10. The scanner assembly of claim 1, wherein the first plastic body and the second plastic body comprise at least one of liquid crystal polymer and amorphous polymer.

11. The scanner assembly of claim 1, wherein the first plurality of coupling structures each have a diameter between 0.55 mm and 0.65 mm.

12. The scanner assembly of claim 1, wherein the movable scanning platform comprises a microelectromechanical (MEMS) scanning mirror.

13. A scanner assembly, comprising:
    a first plastic body, the first plastic body insert molded to include at least a first magnet and a first field focusing plate encased within the first plastic body, the first plastic body further including a first plurality of coupling structures;
    a second plastic body, the second plastic including a second plurality of coupling structures, each of the second plurality of coupling structures laser welded to a corresponding one of the first plurality of coupling structures; and
    a scanning mirror positioned between the first plastic body and the second plastic body, the scanning mirror including a conductive coil configured to drive motion of the scanning mirror in the presence of a magnetic field generated by at least the first magnet.

14. The scanner assembly of claim 13, wherein the first plurality of coupling structures comprise posts and wherein the second plurality of coupling structures comprise holes, and wherein the posts have a diameter between 0.55 mm and 0.60 mm.

15. The scanner assembly of claim 13, wherein each of the second plurality of coupling structures is welded to corresponding one of the first plurality of coupling structures by an infrared laser through a mask including at least one blocking feature and at least one passing feature for each of the second plurality of coupling structures to achieve a weld depth of greater than 0.20 mm.

16. The scanner assembly of claim 13, wherein the first plastic body and the second plastic body comprise at least one of a liquid crystal polymer and an amorphous polymer.

17. A microelectromechanical (MEMS) scanner assembly, comprising:
- a first plastic body, the first plastic body insert molded to include at least a first magnet and a first field focusing plate encased within the first plastic body, the first plastic body further including a first plurality of coupling structures;
- a second plastic body, the second plastic body insert molded to include at least a second magnet and second field focusing plate encased within the second plastic body, the second plastic further including a second plurality of coupling structures, each of the second plurality of coupling structures laser welded to a corresponding one of the first plurality of coupling structures; and
- a MEMS scanning mirror positioned between the first plastic body and the second plastic body, the MEMS scanning mirror including a conductive coil configured to drive motion of the MEMS scanning mirror in the presence of a magnetic field generated by at least the first magnet and the second magnet.

18. The MEMS scanner assembly of claim 17, wherein the first plurality of coupling structures comprise posts and wherein the second plurality of coupling structures comprise holes, and wherein the posts have a diameter between 0.55 mm and 0.60 mm.

19. The MEMS scanner assembly of claim 18, wherein each of the second plurality of coupling structures is welded to corresponding one of the first plurality of coupling structures by an infrared laser through a mask including at least one blocking feature and at least one passing feature for each of the second plurality of coupling structures to achieve a weld depth of between 0.20 mm and 0.27 mm.

20. The MEMS scanner assembly of claim 17, wherein the first plastic body and the second plastic body comprise reinforcing particulate such that the first plastic body and the second plastic body absorb the laser used to weld the first plurality of coupling structures and the second plurality of coupling structures.

* * * * *